United States Patent
Kobashi

(10) Patent No.: US 9,988,544 B2
(45) Date of Patent: Jun. 5, 2018

(54) INK FOR INKJET, COLOR FILTER, MANUFACTURING METHOD THEREFOR, COLOR REFLECTION-TYPE DISPLAY, AND MANUFACTURING METHOD THEREFOR

(71) Applicant: Toppan Printing Co., Ltd., Taito-ku (JP)

(72) Inventor: Yasuhiro Kobashi, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 456 days.

(21) Appl. No.: 14/628,832

(22) Filed: Feb. 23, 2015

(65) Prior Publication Data
US 2015/0275009 A1  Oct. 1, 2015

Related U.S. Application Data

(63) Continuation of application No. PCT/JP2013/004935, filed on Aug. 21, 2013.

(30) Foreign Application Priority Data

Aug. 22, 2012 (JP) .................................. 2012-183347

(51) Int. Cl.
C09D 11/36 (2014.01)
C09D 11/38 (2014.01)
(Continued)

(52) U.S. Cl.
CPC .............. C09D 11/36 (2013.01); B41M 3/003 (2013.01); B41M 5/007 (2013.01);
(Continued)

(58) Field of Classification Search
CPC ...... C09D 11/36; C09D 11/38; C09D 127/14; C09D 127/16; C09D 127/18;
(Continued)

(56) References Cited

U.S. PATENT DOCUMENTS 9,256,112 B2 * 2/2016 Kobashi .................. G02F 1/167
9,335,454 B2 * 5/2016 Kinoshita .............. G02B 5/201
(Continued)

FOREIGN PATENT DOCUMENTS

CN  101906259 A  12/2010
JP  1-86116  3/1989
(Continued)

OTHER PUBLICATIONS

English translation of the Written Opinion of the International Search Authority dated Nov. 26, 2013 for PCT/JP2013/004935; 5 pages.*

(Continued)

*Primary Examiner* — Helene Klemanski
(74) *Attorney, Agent, or Firm* — Oblon, McClelland, Maier & Neustadt, L.L.P.

(57) ABSTRACT

An ink for a piezoelectric driving-type inkjet for printing on a resin-based ink receiving layer formed on one surface of a reflection-type display contains 30% by weight to 75% by weight of a solvent which hardly dissolves the ink receiving layer and 3% by weight to 30% by weight of an alcohol-based solvent which easily dissolves the ink receiving layer.

20 Claims, 4 Drawing Sheets

(51) Int. Cl.
*C09D 127/14* (2006.01)
*C09D 127/16* (2006.01)
*C09D 127/18* (2006.01)
*B41M 3/00* (2006.01)
*B41M 5/00* (2006.01)
*G02B 5/22* (2006.01)
*G02B 5/26* (2006.01)
*G02F 1/1335* (2006.01)
*G02F 1/167* (2006.01)
*G02B 5/20* (2006.01)

(52) U.S. Cl.
CPC .......... *B41M 5/0047* (2013.01); *C09D 11/38* (2013.01); *C09D 127/14* (2013.01); *C09D 127/16* (2013.01); *C09D 127/18* (2013.01); *G02B 5/223* (2013.01); *G02F 1/167* (2013.01); *G02B 5/201* (2013.01); *G02F 1/133516* (2013.01)

(58) Field of Classification Search
CPC .... B41M 3/003; B41M 5/0047; B41M 5/007; G02B 5/223; G02B 5/201; G02B 5/26; G02F 1/133516
USPC .............. 106/31.58, 31.59, 31.86, 31.89
See application file for complete search history.

(56) References Cited

U.S. PATENT DOCUMENTS

| | | | | |
|---|---|---|---|---|
| 9,383,622 | B2 * | 7/2016 | Kobashi | G02B 5/201 |
| 2006/0258774 | A1 | 11/2006 | Kim et al. | |
| 2006/0283353 | A1 * | 12/2006 | Chen | C09D 11/037 |
| | | | | 106/31.57 |
| 2009/0284698 | A1 | 11/2009 | Kim et al. | |
| 2011/0001777 | A1 * | 1/2011 | Hayashi | C09D 11/322 |
| | | | | 347/20 |
| 2011/0017099 | A1 * | 1/2011 | Tateishi | C09D 11/322 |
| | | | | 106/494 |
| 2012/0015158 | A1 | 1/2012 | Kim et al. | |
| 2013/0036938 | A1 * | 2/2013 | Higashi | C09D 11/322 |
| | | | | 106/31.77 |

FOREIGN PATENT DOCUMENTS

| | | |
|---|---|---|
| JP | 2000-43405 | 2/2000 |
| JP | 2000-111723 | 4/2000 |
| JP | 2000-238408 | 9/2000 |
| JP | 2003-107234 | 4/2003 |
| JP | 2003-161964 | 6/2003 |
| JP | 2003-261827 | 9/2003 |
| JP | 2006-209115 | 8/2006 |
| JP | 2008-531766 | 8/2008 |
| JP | 2008-272972 | 11/2008 |
| JP | 2010-276986 | 12/2010 |
| JP | 2011-057834 | 3/2011 |
| JP | 2011-164647 | 8/2011 |
| JP | 2002-311223 | 10/2012 |
| TW | 201105753 A1 | 2/2011 |
| WO | WO 2006/098575 A1 | 9/2006 |

OTHER PUBLICATIONS

English translation of JP 2000/111723, Apr. 2000; 13 pages.*
English translation of JP 2002/311223, Oct. 2002; 11 pages.*
English translation of JP 2011/057834, Mar. 2011; 41 pages.*
International Search Report dated Nov. 26, 2013 in PCT/JP2013/004935 filed Aug. 21, 2013.
Combined Office Action and Search Report dated Nov. 3, 2015 in Chinese Patent Application No. 201380026464.3 (with English language translation and English translation of Category of Cited Documents).
Extended European Search Report dated Nov. 16, 2015 in Patent Application No. 13830651.9.
Combined Taiwanese Office Action and Search Report dated Dec. 13, 2016 in Patent Application No. 102129942 (with English Translation and English Translation of Category of Cited Documents).

* cited by examiner

INK FOR INKJET, COLOR FILTER, MANUFACTURING METHOD THEREFOR, COLOR REFLECTION-TYPE DISPLAY, AND MANUFACTURING METHOD THEREFOR

CROSS-REFERENCE TO RELATED APPLICATIONS

The present application is a continuation of International Application No. PCT/JP2013/004935, filed Aug. 21, 2013, which is based upon and claims the benefits of priority to Japanese Application No. 2012-183347, filed Aug. 22, 2012. The entire contents of these applications are incorporated herein by reference.

BACKGROUND OF THE INVENTION

Technical Field

The present invention relates to an ink for an inkjet, a color filter, a manufacturing method therefor, a reflection-type display, and a manufacturing method therefor.

Background Art

With the spread of electronic information networks, electronic publishing represented by e-books has been performed. A device displaying electronic publishing and electronic information, a self-luminous-type display device or a backlight-type display device has been used. However, when compared to a medium printed on paper, these display devices make a user get easily fatigued due to ergonomic reasons when used for a long period of time. Further, since power consumption is large, the time for display is restricted when the display device is driven by a battery. In contrast to these drawbacks, since characters can be read from a reflection-type display represented by electronic paper in a sense close to paper, fatigue can be reduced. In addition, since display performance can be exhibited in a place getting sunshine or light outdoors, the reflection-type display is suitable for outdoor signage. Further, power consumption is low so that the device can be driven for a long period of time. Since power is not consumed other than when rewriting the screen, the reflection-type device is extensively used for digital signage or electronic shelf label and development of the reflection-type display has been extensively active.

SUMMARY OF INVENTION

According to one aspect of the present invention, an ink for forming a color filter for a reflection-type display includes 30% by weight to 75% by weight of an organic solvent and 3% by weight to 30% by weight of an alcohol-based solvent. The organic solvent includes at least one compound selected from 2-(2-Ethoxyethoxyl)ethanol, diethylene glycol monomethyl ether, diethylene glycol monoethyl ether, diethylene glycol monobutyl ether and 2-Ethoxyethanol, or an acetate of the compound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a) and 3(b) are explanatory diagrams of a method of forming a colored pixel.

FIGS. 4(a) and 4(b) are explanatory diagrams of a shape of the colored pixel.

DETAILED DESCRIPTION OF THE EMBODIMENTS

Figure 1:
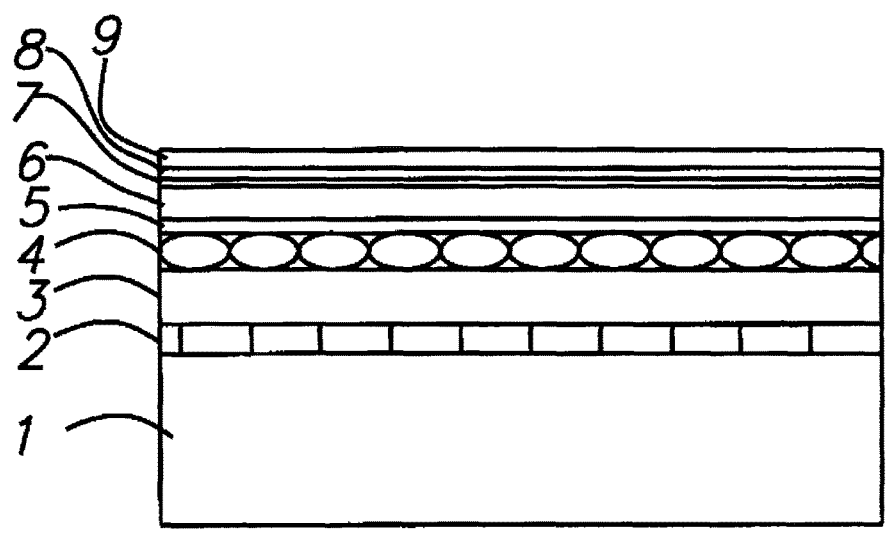
FIG. 1 illustrates an embodiment of the invention, and is an explanatory diagram of a configuration of a color reflection-type display.

The embodiments will now be described with reference to the accompanying drawings, wherein like reference numerals designate corresponding or identical elements throughout the various drawings.

Hereinafter, embodiments of the invention will be described in detail.

A color reflection-type display of the invention is a display obtained by combining a monochrome reflection-type display and a color filter or by adding a color printing process using an inkjet method to a process of preparing an existing monochrome reflection-type display.

In a reflection-type display generally represented by electronic paper, as a method of preparing an electrophoretic display device which is a kind of electronic paper, an electrophoretic display device sealing a dispersion system which contains electrophoretic particles between counter electrode plates whose at least one surface is a light transmissive type and performing required display by changing optical reflection characteristics using a voltage for display control, which is applied to a space between the electrodes, described in PTL 3, is exemplified.

The color filter of the invention is used by combining with the reflection-type display, and a color filter layer may be directly formed on the reflection-type display. At this time, the ink receiving layer is provided on the electrode layer of the reflection-type display to form a color filter layer using an inkjet method. FIG. 1 is an explanatory diagram illustrating the layer configuration of color electronic paper as an example of the reflection-type display. The color electronic paper has a configuration in which an electrode layer 2, an electrode pattern layer 3, a microcapsule layer 4, a light transmissive electrode layer 5, an electrode sheet layer 6, an ink holding layer 7, a color filter layer 8, and a protective film 9 are sequentially laminated on a base layer 1.

As the ink receiving layer, that is, the ink holding layer 7, for example, an inkjet recording medium described in PTL 4 and a recording medium for an inkjet printer described in PTL 5 can be used. Particularly, a layer with high transparency is preferable. However, as described in PTL 6, a receiving material for an inkjet having a porous structure cannot be used as the ink receiving layer of the invention. This is because uniformity of wet spreading is damaged due to the ink infiltrated in the layer in a case where the ink receiving layer has a porous structure. That is, the ink receiving layer is required to be a type that holds the ink on the film. A material of the ink receiving layer is necessary to have performance of transparency and various resistances and is free from discoloration or color-fading of the received ink, and preferred examples thereof include a vinyl resin such as polyvinyl butyral or polyvinyl acetate. A solvent of the ink receiving layer is configured using an aqueous solvent such as water or IPA or an alcohol solvent.

Coating is performed such that the material of the ink receiving layer has a thickness of, for example, 4 μm to 10 μm after being dried using a coating apparatus. The coating apparatus performs coating using a die coater, a spin coater, or a bar coater. However, the coating methods are not limited to these methods.

The ink receiving layer is formed by applying the ink receiving layer material thereto and then solidifying the material by a method using heat, vacuum, or UV irradiation.

The material of the colored ink of the invention contains a colorant, a resin, a dispersant, and a solvent. The colorant of the ink may be one of a pigment and a dye. It is preferable that three kinds of colors which are red, green, and blue be used for the color tone thereof, but yellow, light blue, or violet may be used. In addition, a combination of colors is not limited and only two kinds of colors may be combined.

Specific examples of pigments being used as colorants include Pigment Red 9, 19, 38, 43, 97, 122, 123, 144, 149, 166, 168, 177, 179, 180, 192, 215, 216, 208, 216, 217, 220, 223, 224, 226, 227, 228, and 240; Pigment Blue 15, 15:6, 16, 22, 29, 60, and 64; Pigment Green 7 and 36; Pigment Red 20, 24, 86, 81, 83, 93, 108, 109, 110, 117, 125, 137, 138, 139, 147, 148, 153, 154, 166, 168, and 185; Pigment Orange 36; and Pigment Violet 23, but the pigments are not limited thereto. Further, two or more kinds thereof may be combined in order to obtain a desired color tone.

Examples of the resin of the colored ink material include casein, gelatin, polyvinyl alcohol, carboxymethyl acetal, a polyimide resin, an acrylic resin, an epoxy resin, and a melamine resin, and the resin can be appropriately selected from a relationship with the color tone. When heat resistance or light resistance is required, an acrylic resin is preferable.

A dispersant may be used to improve dispersion of a colorant to a resin, and examples of the dispersant include a non-ionic surfactant such as polyoxyethylene alkyl ether; an ionic surfactant such as sodium alkylbenzene sulfonate, a poly fatty acid salt, fatty acid salt alkyl phosphate, or a teteraalkyl ammonium salt; an organic pigment derivative; and polyester. The dispersant may be used alone or in combination of two or more kinds thereof.

As the solvent used for a colored ink, a solvent having a surface tension of 35 mN/m or smaller which is a proper value for the inkjet printing and having a boiling point of 130° C. or higher is preferable. When the surface tension is 35 mN/m or greater, this adversely and significantly affects stability of a dot shape at the time of inkjet ejection. In addition, when the boiling point thereof is 130° C. or lower, a drying property in the vicinity of nozzles becomes significantly increased, as a result, this leads to generation of defects such as nozzle clogging, which is not preferable. It is preferable to adjust the viscosity to be in the range of 5 cps to 20 cps. The present inventors found that the solvent used for the ink significantly affects the ink absorption amount of the ink receiving layer. In other words, when a ratio in an ink of a solvent which easily dissolves the ink receiving layer to the ink is increased, ink receiving performance is improved, and when a solvent which hardly dissolves or does not dissolve the ink receiving layer is used, the ink receiving performance is decreased and the wettability of droplets is improved. Specifically, in a case where the ink receiving layer which can be dissolved in an aqueous solvent is formed, a solvent in which the receiving layer is not dissolved much such as carbitols and an alcohol-based solvent which easily dissolves the receiving layer are used in the ink. In addition, by controlling the ratio thereof, it is possible to achieve both of the ink receiving property and color uniformity in a pixel. The carbitols indicate carbitol-based solvents such as diethylene glycol monomethyl ether, diethylene glycol monoethyl ether, and diethylene glycol monobutyl ether, or cellosolves of these, and acetate compounds of carbitols.

As an alcohol-based solvent which easily dissolves the receiving layer, benzyl alcohol is used. Further, as a solvent in which the receiving layer is not dissolved much, diethylene glycol monoethyl ether acetate and butyl glycol acetate are used. As the ink composition, 20 (% by weight) of a dispersed resin, 2 (% by weight) of a pigment, 58 (% by weight) of a solvent of diethylene glycol monoethyl ether acetate, 10 (% by weight) of benzyl alcohol, and 10 (% by weight) of butyl diglycol acetate are set to be prepared.

In a case where a ratio of solvent components in which the receiving layer is not dissolved much to the ink composition is set to 30 (% by weight) or smaller and a ratio of an alcohol-based solvent which easily dissolves the receiving layer to the ink composition is set to 30 (% by weight) or greater, the ink is infiltrated into the receiving layer at the time when the ink is printed on the receiving layer and a gap is generated between droplets which is referred to as a void. In addition, in a case where a ratio of solvent components in which the receiving layer is not dissolved much to the ink composition is set to 75 (% by weight) or greater and a ratio of an alcohol-based solvent which easily dissolves the receiving layer to the ink composition is set to 3 (% by weight) or smaller, the reception performance is deteriorated so that the shape becomes a circular shape due to the surface tension of the ink. Accordingly, in order for the invention to exhibit a further effect, it is understood that the ratio of the ink composition having an organic solvent of carbitols in the range of 30% by weight to 75% by weight and benzyl alcohol in the range of 3% by weight to 30% by weight is preferable. The organic solvent comprises at least one of diethylene glycol monomethyl ether, diethylene glycol monoethyl ether, diethylene glycol monobutyl ether, ethylene glycol monomethyl ether, ethylene glycol monoethyl ether, ethylene glycol monobutyl ether, diethylene glycol monomethyl ether acetate, diethylene glycol monoethyl ether acetate, and diethylene glycol monobutyl ether acetate. Moreover, the ink may contain at least one kind of pigment for coloring or dye for coloring in the range of 0.5% by weight to 10% by weight.

In a case where a silicone-based material or a fluorine-based material is added to the ink as a surfactant, the surface tension of the ink is decreased and wet spreading becomes large. It is found that the color uniformity in a pixel can be improved using this property. As an example of the surfactant, a silicone resin or silicone rubber which includes organic silicone or an alkyl fluoro group in the main chain or the side chain thereof and contains a siloxane component; and fluororesins of vinylidene fluoride, vinyl fluoride, trifluoroethylene, etc. and their copolymers or the like can be used. A silicone-based compound or a fluorine-based compound is provided in a solid content ratio of 0.01 (% by weight) to 3.00 (% by weight). In a case where the addition amount thereof is smaller than 0.01 (% by weight), the wet spreading effect is not significant. In a case where the addition amount thereof is 3.00 (% by weight) or greater, since the surface tension of the ink is extremely decreased, ejection performance of the inkjet becomes degraded. Therefore, when the ink receiving property and the uniformity in a pixel are controlled using a surfactant, the addition amount of the surfactant is adjusted to be within the range of 0.01 (% by weight) to 3.00 (% by weight).

Pattern printing is performed on a transparent base for preparation of the color filter using the inkjet method. Alternatively, printing of an arbitrary pattern is performed in accordance with an electrode substrate on which electrode wiring is patterned. In both cases, the ink receiving layer is formed on one surface in advance.

Next, the embodiment of an inkjet apparatus used in the invention will be described with reference to the accompanying drawings.

Figure 2:
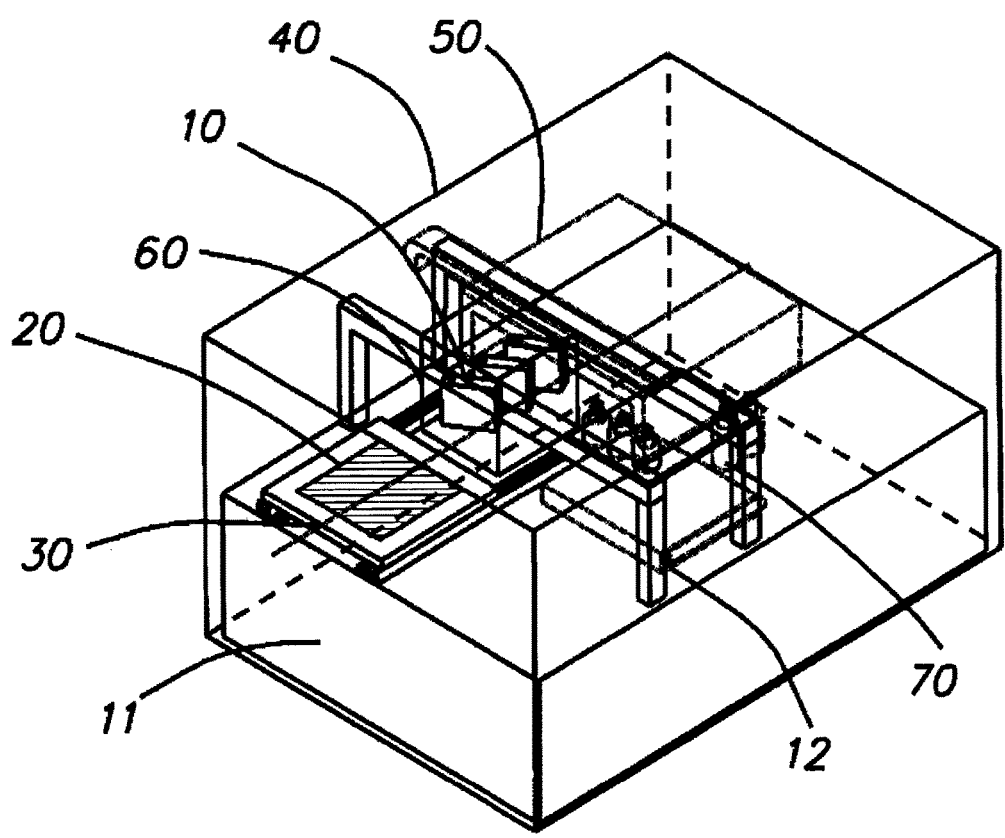
FIG. 2 illustrates the embodiment of the invention, and is an explanatory diagram of an inkjet printer.

FIG. 2 is an explanatory diagram of an inkjet coating apparatus 40 in a method of manufacturing color electronic paper of the invention. As the configuration of the apparatus, the coating apparatus includes a conveying stage 30 which carries a reflection-type display 20 and conveys the reflection-type display in one direction with high precision, an ink tank 70, an inkjet head 10 to which an inkjet ink for applying to a reflection-type display panel is supplied from the ink tank 70, an inkjet head unit 60 capable of moving the inkjet head 10 in a direction orthogonal to the conveyance direction by holding a certain level of height from the reflection-type display 20, and a drying unit 50.

A piezoelectric driving-type inkjet head is used for the inkjet head 10. A plurality of nozzles ejecting the ink are included, and the nozzles are arranged to have predetermined intervals with respect to a scanning direction in which the inkjet head 10 is relatively scanned with respect to a colored pixel pattern (hereinafter, simply referred to as a pixel pattern) of a color filter layer. Further, an inkjet head control substrate 11 for ejecting and controlling the inkjet ink from the nozzles of the inkjet head 10 is included. By setting the distance from the nozzles of the inkjet head 10 to the reflection-type display 20 to 300 μm to 2000 μm, coating can be performed with high coating precision. The risk of the inkjet head 10 coming into contact with the reflection-type display 20 is increased when the distance thereof is 300 μm or less, and an ejection flying curve (misdirection) is easily generated when the distance thereof is 2000 μm or greater. In addition, a maintenance apparatus 12 for recovering an ejecting property of the nozzles of the inkjet head 10 is included. The maintenance apparatus 12 includes a pot or the like for performing wiping or ejecting a liquid on the nozzle surface using a rag or a film, and a commonly used inkjet head maintenance mechanism 12 can be used. In order to determine a position of a pixel pattern of coating color electronic paper, it is preferable to include a camera for alignment and an image processing unit. Even in a case where a color filter pattern is printed on a transparent base, since an alignment mark for adhering with the reflection-type display panel is needed for the base, it is preferable to include a camera for alignment and an image processing unit.

In the invention, using the inkjet coating apparatus 40 illustrated in FIG. 2, the inkjet head 10 including a plurality of nozzles is relatively scanned with respect to the pixel pattern, the inkjet ink is ejected and supplied to a surface on which the ink receiving layer of the reflection-type display 20 is provided, and an inkjet ink layer, that is, a color filter layer is formed on the ink receiving layer. Further, in the invention, the inkjet head 10 including the plurality of nozzles is relatively scanned with respect to the pixel pattern. As illustrated in FIG. 2, the reflection-type display 20 side may be scanned or the inkjet head 10 side may be scanned. In addition, both of the reflection-type display 20 and the inkjet head 10 may be operated.

Figure 3A:
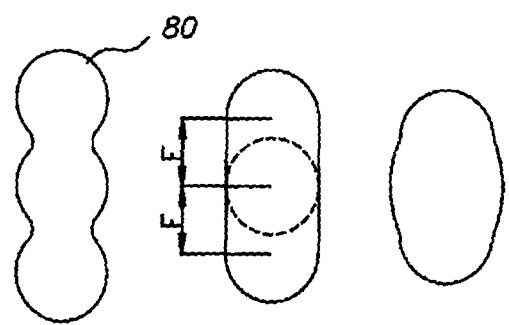
FIG. 3(a) and FIG. 3(b) illustrate the embodiment of the invention.
Figure 3B:
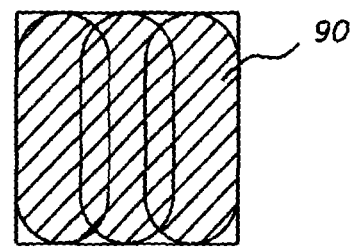

It is preferable to perform inkjet ejection arrangement according to the size of the pixel for the pixel shape of the invention to be close to a rectangular shape. That is, it is preferable to prepare a pattern with precision higher than that of a relationship among the pixel size, the droplets, and the impacting area. FIG. 3(a) and FIG. 3(b) are explanatory diagrams illustrating the pixel shape and the ejection arrangement pattern. As illustrated in FIG. 3(a), an ink droplet impacting unit 80 is continuously ejected to prepare long hole-shaped pixels. At this time, since the shape becomes recessed in a case where an interval F between ink droplets is long and the center portion becomes projected in a case where the interval is short, it is preferable to adjust the droplet diameter and the interval F and prepare a shape which is longitudinally linear. As illustrated in FIG. 3(b), an arbitrary number of the long hole shapes are horizontally arranged to form a predetermined pixel colored portion 90.

Figure 4A:
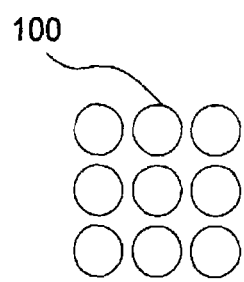
FIG. 4(a) and FIG. 4(b) illustrate the embodiment of the invention.
Figure 4B:
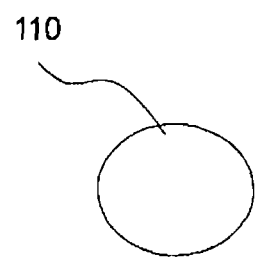

FIG. 4(a) and FIG. 4(b) are explanatory diagrams illustrating pixels. In a case where a solvent which easily dissolves the receiving layer is largely contained as the ink composition, color unevenness is generated in a pixel so that the shape becomes a pixel shape 100 as illustrated in FIG. 4(a). In addition, in a case where a solvent which hardly dissolves the receiving layer is largely contained, the shape of the pixel becomes close to an elliptical shape 110 as illustrated in FIG. 4(b).

After the ink receiving layer is coated with the ink, drying and solidifying the ink are performed. As drying means and/or solidifying means, any method among heating, air blast, reduced pressure, light irradiation, and electron beam irradiation or a combination of two or more kinds thereof can be used.

After the ink is dried and solidified, a protective film may be formed for protection of the color filter layer. In order to form the protective film of the color filter, an organic resin such as polyamide, polyimide, polyurethane, polycarbonate, an acrylic resin, or a silicone-based resin or an inorganic film such as $Si_3N_4$, $SiO_2$, SiO, $Al_2O_3$, or $Ta_2O_3$ can be provided on the surface of the colored pattern as a protective film using a coating method such as spin coating, roll coating, or a printing method; or a deposition method. In a case where the surface of the color filter layer is adhered to the reflection-type display and the color filter base has a function of protecting the color filter layer, the protective film does not need to be formed.

Example 1

As Example 1, a method of preparing a reflection-type display on which a color filter is printed in a matrix shape will be described.

A reflection-type display is prepared using a microcapsule-type electrophoretic system. A display device in this system is a device in which positively and negatively charged white particles and black particles are put into a microcapsule which is filled with a transparent solvent and an image is formed by pulling respective particles up to the display surface by applying an external voltage thereto. Since the size of the microcapsule is several tens of μm to several hundreds of μm, which is small, coating is possible like an ink when the microcapsule is allowed to be dispersed in a transparent binder. An image can be drawn with the ink when a voltage is applied from the outside.

When a transparent resin film on which a transparent electrode is formed is coated with this electronic ink and the resin film is adhered to a substrate in which an electrode circuit for driving an active matrix is formed, an active matrix display panel can be obtained. In general, a component in which a transparent resin film on which a transparent electrode is formed is coated with an electronic ink is referred to as a "front plane laminate," and a substrate in which an electrode circuit for driving an active matrix is formed is referred to as a "back plane."

An ink holding layer is provided on a front plane laminate side. A material obtained by mixing an urethane-based resin, toluene, water, and IPA is used as a material of the ink receiving layer, and the material is applied such that the drying thickness thereof is within the range of 7 μm to 9 μm using a die coater.

The ink composition will be described. As the ink composition used for printing, a Red ink contains 20 (% by weight) of a dispersed resin, 2 (% by weight) of a pigment, 58 (% by weight) of a solvent of diethylene glycol monoethyl ether acetate, 10 (% by weight) of benzyl alcohol, and 10 (% by weight) of butyl diglycol acetate.

In the inkjet apparatus, printing is performed in a grid-shaped pattern on the ink holding layer. As the printing pattern, a 3×3 droplet coating is performed so as to be put in the pixel size of a 160 μm square. The amount of one droplet is approximately 15 pL, and the printing is performed such that the interval between droplets becomes 40 μm. In this manner, the interval between pixels becomes in the range of 5 μm to 8 μm and the coloring rate in a pixel becomes approximately 90%. In addition, the chromaticity (x, y, Y) in a pixel is measured with a spot diameter of 10 μm using a spectroscope. The chromaticity of Red becomes an x of 0.431, a y of 0.305, and a Y of 42.1 in the center and an x of 0.422, a y of 0.307, and a Y of 45.8 in a site close to the outer peripheral portion. A difference among colors is 0.01 or smaller, which can be said to be a small number.

After the color filter layer is dried using hot air at 100° C. for 5 minutes, the protective film is laminated thereon, and a color reflection-type display is prepared.

Example 2

The same reflection-type display and receiving layer as those in Example 1 are used here. As the ink composition, a Red ink contains 20 (% by weight) of a dispersed resin, 2 (% by weight) of a pigment, 18 (% by weight) of a solvent of diethylene glycol monoethyl ether acetate, 50 (% by weight) of benzyl alcohol, and 10 (% by weight) of butyl diglycol acetate. In the inkjet apparatus, printing is performed in a grid-shaped pattern on the ink holding layer. As the printing pattern, a 3×3 droplet coating is performed so as to be put in the pixel size of a 160 μm square. The amount of one droplet is approximately 15 pL, and the printing is performed such that the interval between droplets becomes 40 μm. A gap is generated between droplets, which is referred to as a void in a pixel formed using the ink. That is, when a ratio of benzyl alcohol to the ink composition is extremely high, a pixel with a uniform color cannot be formed and a color filter layer with high efficiency cannot be formed.

In a reflection-type display represented by electronic paper, when the reflection-type display is necessary to display only character information of e-books, a white and black display is sufficient, but a color display is vital technology to enhance illustrations of e-books, advertisements, signage, an eye-catching effect, images, or catalogs and, accordingly, color displays have been highly demanded with the colorization of display content. Here, as colorization of the reflection-type display, the following method has been proposed.

A reflection-type display and a color filter are combined, and a color area intended to be displayed is set to white display according to a pattern displayed on a monochrome display device and a color area intended to be hidden is set to black display, as a result, display with a color pattern becomes possible (PTL 1).

As a color filter layer for a reflection-type display, a method of performing color filter arrangement according to an electrode pattern displayed on a monochrome display device has been proposed (PTL 2).

CITATION LIST

Patent Literature

PTL 1: JP-A-2003-161964
PTL 2: JP-A-2003-107234
PTL 3: JP-A-1-86116
PTL 4: JP-A-2000-43405
PTL 5: JP-A-2008-272972
PTL 6: JP-A-2000-238408

In a method disclosed in PTL 1, it is possible to easily provide a color function by combining a reflection-type display and a color filter when a color function is provided. However, in a case of a color filter for a reflection-type display, since a light shielding portion referred to as a black matrix is provided, extraction efficiency becomes worse due to reflection of light because the color filter for a reflection-type display is different from a color filter for a liquid display, it is not necessary to provide a black matrix.

When the color filter to which a black matrix is not provided is prepared, it is necessary for the color filter to receive an ink in a manner in which colors are not mixed. For this purpose, an ink is required to be received by a substrate using a known technology of ink reception such as providing a transparent partition instead of the black matrix or providing an ink receiving layer on a substrate.

In the case where the transparent partition is provided, a problem in that the reflectance is decreased is generated due to the area of the partition portion. Further, when a bank with light permeability is used, there is a problem in that the cost is increased because processes for preparing the bank are further increased, alignment accuracy of the partition portion is needed, and the thickness of the partition is required to be thin. Providing the ink receiving layer is common because the cost of preparing the color filter is low. Colored pixels are printed on the ink receiving layer using a printing technology such as an inkjet method or a printing method.

A method in which color printing is directly performed on a reflection-type display using an inkjet method and alignment is unnecessitated by removing a process of adhering the color filter to the reflection-type display is proposed. In addition, since the inkjet method is non-contact printing, foreign substances are small, and there is an advantage that the cost becomes low when compared to printing using a plate because the inkjet method is non-plate printing.

However, in a color reflection-type display using a color filter system, in a case where the same color reproducibility is exhibited, when the coloring rate in a pixel is decreased, it is necessary to increase the density or the film thickness of an ink, therefore, the transmittance of the ink is decreased and the reflectance thereof is decreased as well. However, by increasing the coloring rate in a pixel, it is possible to adjust the density or the film thickness of the ink to be low and increase the transmittance of the ink.

That is, by increasing the coloring rate in a pixel, it is possible to exhibit the reflectance and color reproducibility to the maximum, which is a problem of the color reflection-type display. However, when the size of a pixel is simply increased, colors become mixed due to overlapping pixels. Accordingly, in order to increase the coloring rate in a pixel, making the shape of a pixel close to a rectangular shape, improving the coating accuracy, and preventing the mixture of colors become problems to be solved.

In order for the shape of a pixel to be close to a rectangular shape, it is necessary for the ink receiving layer to reliably receive ink droplets. In other words, the shape of a pixel cannot be made into a rectangular shape since the ink may become a circular shape due to the surface tension when ink droplets are printed on a substrate which does not receive ink droplets. However, in a case of an ink receiving layer that absorbs the whole ink droplet, the ink density doubles at the site that where droplets are overlapped and triples at a site where three droplets are overlapped. At this time, it is impossible to make the ink density in one pixel uniform, and thus color tone adjustment becomes impossible. Further, when a distance between droplets is generated, this produces a state having missing pixels, which is referred to as a void, and the void appears as unevenness at the time of the formation of a color filter. That is, in one pixel, the problem is to achieve two elements of suppressing color unevenness not by absorbing the ink to some extent but by mixing the ink, and making the pixel shape close to a rectangular shape by receiving the ink.

An object of the invention is to provide an ink whose color in an ink colored pixel is uniform and which has a high absorption ratio to a receiving layer in the formation of a colored pixel in an inkjet system, and to create a color reflection-type display capable of achieving both white reflectance and color reproducibility.

According to a first aspect of the invention, there is provided an ink for a piezoelectric driving-type inkjet for printing on a resin-based ink receiving layer formed on one surface of a reflection-type display, the ink containing 30% by weight to 75% by weight of a solvent which hardly dissolves the ink receiving layer and 3% by weight to 30% by weight of an alcohol-based solvent which easily dissolves the ink receiving layer.

According to a second aspect of the invention, the ink for an inkjet according to the first aspect of the invention further contains: at least one kind of pigment for coloring or dye for coloring in the range of 0.5% by weight to 10% by weight; an organic solvent of carbitols in the range of 30% by weight to 75% by weight as a solvent which hardly dissolves the ink receiving layer; and benzyl alcohol in the range of 3% by weight to 30% by weight as an alcohol-based solvent which easily dissolves the ink receiving layer.

According to a third aspect of the invention, in the ink for an inkjet according to the first or second aspect of the invention, a fluorine-based surfactant is further contained in the range of 0.01% by weight to 3.00% by weight.

According to a fourth aspect of the invention, there is provided a color filter which is configured using the ink for an inkjet according to any one of the first to third aspects of the invention.

According to a fifth aspect of the invention, there is provided a color reflection-type display which includes the color filter according to the fourth aspect of the invention.

According to a sixth aspect of the invention, there is provided a method of manufacturing a color filter which includes performing inkjet ejection with respect to a surface on which the inkjet receiving layer of the reflection-type display is provided using the ink for an inkjet according to any one of the first to third aspects of the invention to form a color filter.

According to a seventh aspect of the invention, the method of manufacturing a color filter according to the sixth aspect of the invention further includes preparing a long hole-shaped pattern by continuously discharging an ink droplet impacting portion in the inkjet ejection and forming a pixel colored portion by arranging the long hole-shaped pattern.

According to an eighth aspect of the invention, there is provided a method of manufacturing a color reflection type display which includes performing inkjet ejection with respect to a surface on which the ink receiving layer of the reflection type display is provided and forming a color filter using the ink for an inkjet according to any one of the first to third aspects of the invention to manufacture a color reflection-type display.

According to the first and second aspects of the invention, an ink for an inkjet capable of achieving ink receiving performance with respect to an ink receiving layer and color-uniformizing performance due to wet spreading of the ink in the ink colored pixels can be provided, and an arbitrary pixel shape whose color tone can be adjusted can be formed.

According to the third aspect of the invention, by decreasing the surface tension of the ink, it is possible to change color distribution in the ink colored pixel and to adjust the shape and the color tone of the colored pixel.

According to the fourth aspect of the invention, it is possible to create a color filter without color unevenness and with a high coloring rate in a pixel.

According to the fifth aspect of the invention, it is possible to provide an ink with uniform color in the ink colored pixel and with a high absorption ratio to the receiving layer and to create a color reflection-type display capable of achieving white reflectance and color reproducibility.

According to the sixth aspect of the invention, it is possible to create a color filter without color unevenness and with a high coloring rate in a pixel.

According to the seventh aspect of the invention, it is possible to form the pixel colored portion in a shape close to a rectangular shape.

According to the eighth aspect of the invention, it is possible to provide an ink with uniform color in the ink colored pixel and a high absorption rate to the receiving layer, and to create a color reflection-type display capable of achieving white reflectance and color reproducibility.

As understood from the respective configurations described above, according to the invention, it is possible to provide an ink with uniform color in the ink colored pixel and a high absorption rate to the receiving layer, and to create a color reflection-type display capable of achieving white reflectance and color reproducibility in the formation of the colored pixel in the inkjet system.

INDUSTRIAL APPLICABILITY

The invention can be applied to a reflection-type display such as electronic paper.

DESCRIPTION OF REFERENCE NUMERALS

1: BASE LAYER
2: ELECTRODE LAYER
3: ELECTRODE PATTERN LAYER
4: MICROCAPSULE LAYER
5: LIGHT TRANSMISSIVE ELECTRODE LAYER
6: ELECTRODE SHEET LAYER
7: INK HOLDING LAYER
8: COLOR FILTER LAYER
9: PROTECTIVE LAYER
10: INKJET HEAD
11: INKJET HEAD CONTROL SUBSTRATE

12: INKJET HEAD MAINTENANCE MECHANISM
20: REFLECTION-TYPE DISPLAY
30: CONVEYING STAGE
40: INKJET COATING APPARATUS
50: DRYING UNIT
60: INKJET HEAD UNIT
70: INK TANK
80: INK DROPLET IMPACTING UNIT
90: PIXEL COLORED PORTION
100: PIXEL SHAPE (PIXEL CRACK)
110: PIXEL SHAPE (ELLIPTICAL SHAPE)

Obviously, numerous modifications and variations of the present invention are possible in light of the above teachings. It is therefore to be understood that within the scope of the appended claims, the invention may be practiced otherwise than as specifically described herein.

The invention claimed is:

1. An ink for forming a color filter for a reflection-type display, comprising:
    a colorant;
    a resin selected for a color tone of the colorant;
    a dispersant that disperses the colorant to the resin; and
    a solvent comprising an organic solvent in a content of 30% by weight to 75% by weight, and an alcohol-based solvent in a content of 3% by weight to 30% by weight,
    wherein the organic solvent comprises at least one carbitol-based solvent selected from the group consisting of diethylene glycol monomethyl ether, diethylene glycol monoethyl ether, diethylene glycol monobutyl ether, ethylene glycol monomethyl ether, ethylene glycol monoethyl ether, ethylene glycol monobutyl ether, diethylene glycol monomethyl ether acetate, diethylene glycol monoethyl ether acetate, and diethylene glycol monobutyl ether acetate, and the alcohol-based solvent is benzyl alcohol.

2. The ink according to claim 1, wherein the organic solvent comprises at least one carbitol-based solvent selected from the group consisting of diethylene glycol monomethyl ether, diethylene glycol monoethyl ether, diethylene glycol monobutyl ether, diethylene glycol monomethyl ether acetate, diethylene glycol monoethyl ether acetate, and diethylene glycol monobutyl ether acetate.

3. The ink according to claim 1, wherein the carbitol-based solvent is diethylene glycol monoethyl ether acetate.

4. The ink according to claim 1, wherein the colorant comprises at least one coloring pigment or coloring dye in a range of from 0.5% by weight to 10% by weight.

5. The ink according to claim 1, further comprising:
    a fluorine-based surfactant in a range of from 0.01% by weight to 3.00% by weight.

6. The ink according to claim 1, further comprising:
    a fluororesin made from at least one selected from the group consisting of vinylidene fluoride, vinyl fluoride and trifluoroethylene.

7. The ink according to claim 6, wherein the fluororesin is included in a range of from 0.01% by weight to 3.00% by weight.

8. A color filter, comprising:
    an inkjet ink layer made from the ink according to claim 1.

9. A color filter, comprising:
    an inkjet ink layer made from the ink according to claim 2.

10. A color filter, comprising:
    an inkjet ink layer made from the ink according to claim 3.

11. A color reflection-type display, comprising:
    the color filter according to claim 8.

12. A color reflection-type display, comprising:
    the color filter according to claim 9.

13. A color reflection-type display, comprising:
    the color filter according to claim 10.

14. A method of manufacturing a color filter for a reflection-type display, comprising:
    forming an inkjet ink layer on an ink receiving layer of the reflection-type display,
    wherein the forming of the inkjet ink layer comprises ejecting the ink according to claim 1 on the ink receiving layer.

15. The method according to claim 14, further comprising:
    preparing a long hole-shaped pattern by continuously discharging an ink droplet impacting portion in the inkjet ejection such that a pixel colored portion having the long hole-shaped pattern is formed.

16. A method of manufacturing a color filter for a reflection-type display, comprising:
    forming an inkjet ink layer on an ink receiving layer of the reflection-type display,
    wherein the forming of the inkjet ink layer comprises ejecting the ink according to claim 2 on the ink receiving layer.

17. A method of manufacturing a color filter for a reflection-type display, comprising:
    forming an inkjet ink layer on an ink receiving layer of the reflection-type display,
    wherein the forming of the inkjet ink layer comprises ejecting the ink according to claim 3 on the ink receiving layer.

18. A method of manufacturing a color reflection-type display, comprising:
    forming an ink receiving layer; and
    forming a color filter layer on the ink receiving layer,
    wherein the forming of the color filter layer comprises ejecting the ink according to claim 1 on the ink receiving layer.

19. A method of manufacturing a color reflection-type display, comprising:
    forming an ink receiving layer; and
    forming a color filter layer on the ink receiving layer,
    wherein the forming of the color filter layer comprises ejecting the ink according to claim 3 on the ink receiving layer.

20. The method according to claim 19, wherein the ink receiving layer is formed from a urethane resin.

* * * * *